March 1, 1932.  A. F. MASURY  1,847,125
WHEEL MOUNTING
Filed July 1, 1930    2 Sheets-Sheet 2
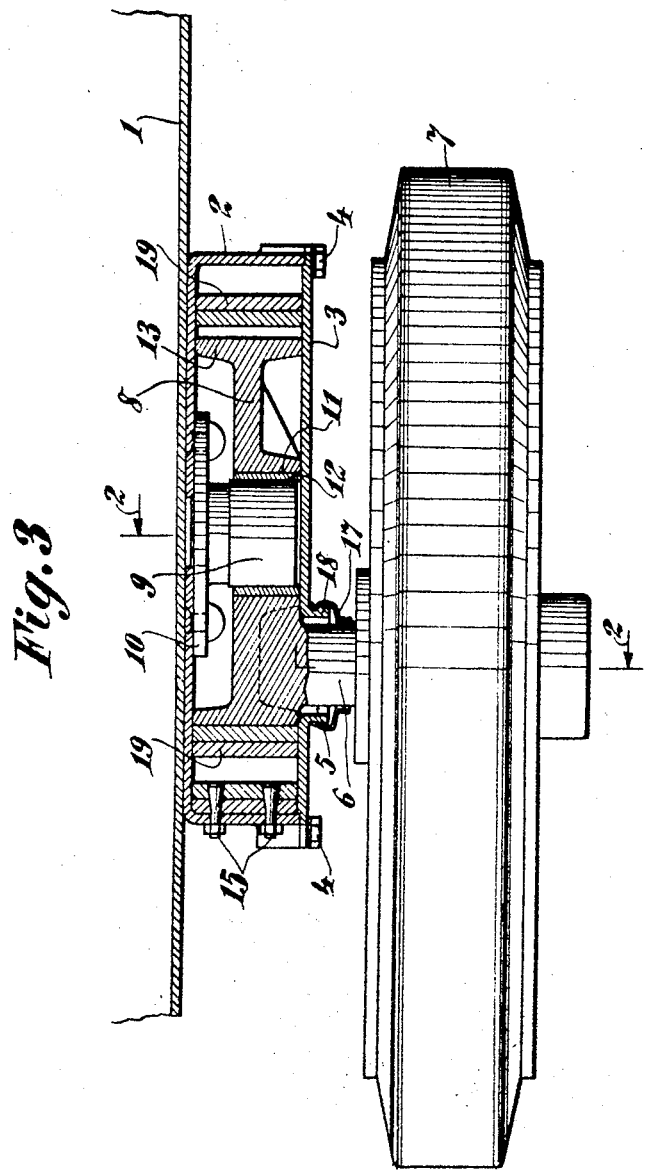
INVENTOR
Alfred F. Masury,
BY
Redding, Greeley, O'Shea & Campbell
HIS ATTORNEYS Patented Mar. 1, 1932

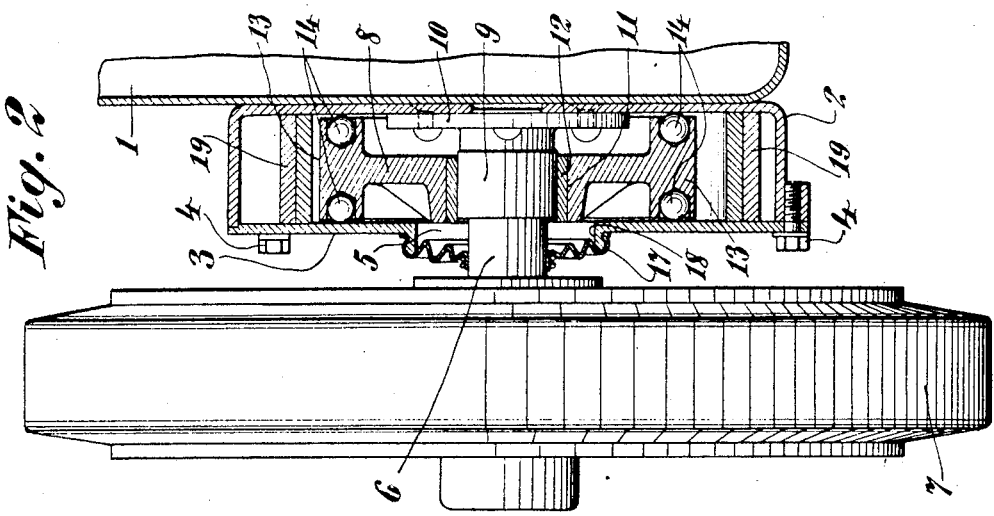
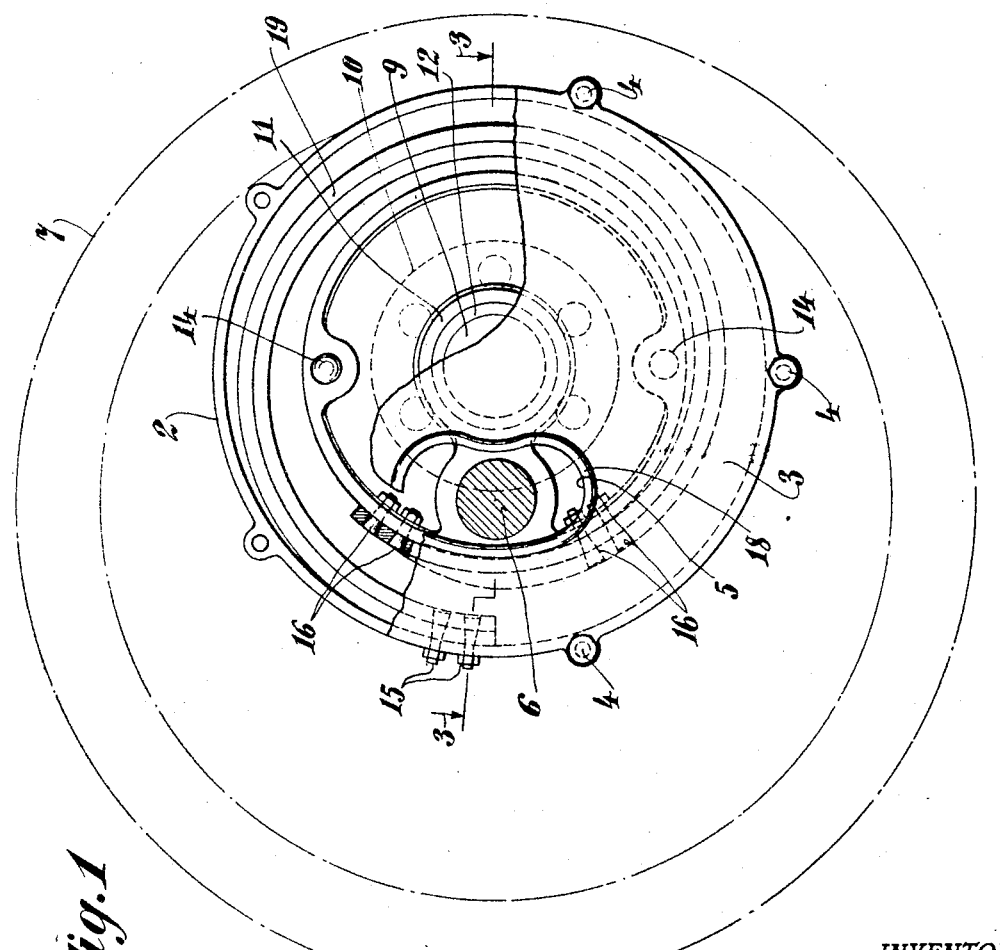

1,847,125

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

WHEEL MOUNTING

Application filed July 1, 1930. Serial No. 465,090.

The present invention relates to wheel mountings and embodies, more specifically, an improved form of mounting for vehicle wheels, such mounting being adapted for use in connection with vehicle wheels which are to be mounted independently upon the vehicle body at a plurality of points. Various forms of wheel mountings have been proposed heretofore with a view to eliminating the axle extending across the vehicle frame and below the same. The present invention has been designed to satisfy certain requirements of wheel mountings of this character where the wheels are to be mounted upon vehicle bodies having an exceptionally low clearance. It is proposed to provide a mounting which is sufficiently strong to resist lateral stresses which are impressed upon the wheels during operation of the vehicle, at the same time affording an adequate cushioning effect for the gravitational forces of the load carried by the vehicle.

An object of the invention, accordingly, is to provide a wheel mounting which is of great strength and which effectively cushions the load of the vehicle, at the same time successfully resisting lateral strains which are impressed upon the wheel.

A further object of the invention is to provide a mounting of the above character in which the parts are of simple construction and readily manufactured and assembled.

Further objects, not specifically enumerated above, will be apparent as the invention is described in greater detail in connection with the accompanying drawings, wherein:

Figure 1 is a view in side elevation, taken in section through the wheel spindle and showing the wheel mounting structure, a portion of the cover plate being broken away in the interest of clearance.

Figure 2 is a view in section, taken on the broken line 2—2 of Figure 3, and looking in the direction of the arrows.

Figure 3 is a view in section, taken on line 3—3 of Figure 1, and looking in the direction of the arrows.

Referring to the above drawings a vehicle body is shown at 1, the side of the body serving as a mounting structure for the wheel and associated parts. A spring housing 2 is secured to the body 1 and is provided with a cover plate 3 which may be secured to the housing by means of bolts 4. Cover plate 2 is provided with an arcuate aperture 5 to receive a wheel spindle 6 upon which a wheel 7 is mounted. The spindle has formed integrally therewith a spindle plate 8, the axis of the spindle plate being eccentric with respect to the axis of the spindle.

A shaft 9 is provided with flange 10 for securing the same to the housing 2 and body 1, as clearly shown in Figure 3. Spindle plate 8 is mounted upon the shaft 9, being formed with a bearing 11 in which a bushing 12 is provided. In this manner the wheel is mounted eccentrically with respect to the shaft 9, movements of the wheel being accommodated by the arcuate slot 5, the radius of which slot extends from the axis of shaft 9.

The spindle plate 8 is provided with a flanged periphery 13 in which ball bearings 14 are mounted, upon opposite sides thereof, thus effectively centering the plate between the housing 2 and cover plate 3. A spiral spring 19 is anchored, at one end, to the spring housing by means of anchor pins 15 and is secured, at its other end, to the outer periphery of the spindle plate by means of similar anchor pins 16. To protect the interior of the housing 2 from dust, etc., a boot 17 is mounted over the shaft and secured over a flange 18, formed at the periphery of the aperture 5. From the foregoing, it will be seen that gravitational forces of the boot 17 will be cushioned by arcuate movement of the spindle 6 in slot 5 about the axis of shaft 9 as a center. Spring 19 effectively cushions such movement as will be readily apparent. The spindle and spindle plate structure is extremely rugged and capable of effectively resisting lateral stresses which may be impressed upon the wheel structure and associated mounting elements.

While the invention has been described with specific reference to the accompanying drawings, it is not to be limited, save as defined in the appended claims.

I claim as my invention:

1. A vehicle wheel mounting comprising a spindle mounting a wheel, a spindle plate carried by the spindle, a housing carried by the vehicle to journal the plate on a vehicle frame eccentrically of the spindle, a peripheral flange on the plate, bearings carried by the flange to engage opposite walls of the housing to receive the lateral thrusts of the wheel, and yielding means connected between the plate and vehicle to cushion relative movement of the spindle.

2. A vehicle wheel mounting comprising a spindle mounting a wheel, a spindle plate carried by the spindle, a housing for the plate carried by the vehicle, means carried by the housing to journal the plate eccentrically of the spindle, a spiral spring connected between the plate and vehicle to cushion relative movement of the spindle, and a cover plate for the housing.

3. A vehicle wheel mounting comprising a spindle mounting a wheel, a spindle plate carried by the spindle, a housing for the plate carried by the vehicle, means carried by the housing to journal the plate eccentrically of the spindle, a spiral spring connected between the plate and vehicle to cushion relative movement of the spindle, a peripheral flange on the plate, bearings carried by the flange to receive the lateral thrust of the wheel, and a cover plate for the housing, said cover plate receiving the thrust of the bearings.

4. A vehicle wheel mounting comprising a spindle mounting a wheel, a spindle plate carried by the spindle, a housing for the plate carried by the vehicle, means carried by the housing to journal the plate eccentrically of the spindle, a spiral spring connected between the plate and vehicle to cushion relative movement of the spindle, a peripheral flange on the plate, bearings carried by the flange to receive the lateral thrust of the wheel, a cover plate for the housing, and an arcuate aperture in the plate to permit movement of the spindle with respect thereto.

5. A vehicle wheel mounting comprising a spindle mounting a wheel, a spindle plate carried by the spindle, a circular housing carried by the vehicle, a cover plate secured to the housing, a stub shaft in the housing to journal the spindle plate, a peripheral flange on the spindle plate, bearings between the flange and cover plate and housing, and a spiral spring between the spindle plate and housing.

6. A vehicle wheel mounting comprising a spindle mounting a wheel, a spindle plate carried by the spindle, a circular housing carried by the vehicle, a cover plate secured to the housing, said cover plate being formed with an arcuate aperture to receive the spindle, a stub shaft in the housing to journal the spindle plate, a peripheral flange on the spindle plate, bearings between the flange and cover plate and housing, and a spiral spring between the spindle plate and housing.

This specification signed this 27th day of June A. D. 1930.

ALFRED F. MASURY.